Jan. 10, 1950
C. M. WOLFE
2,494,109
METALLIC FILM ELECTRICAL PICKUP
Filed April 29, 1949
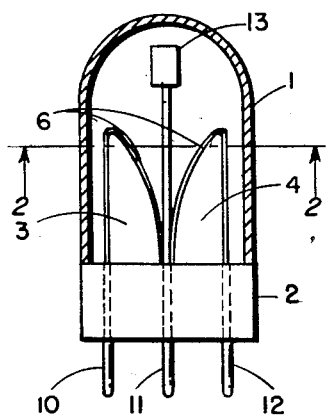
Fig. 1
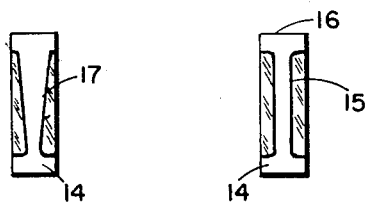
Fig. 5   Fig. 4
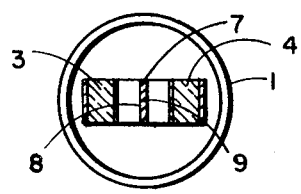
Fig. 2   Fig. 3
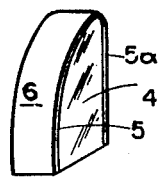
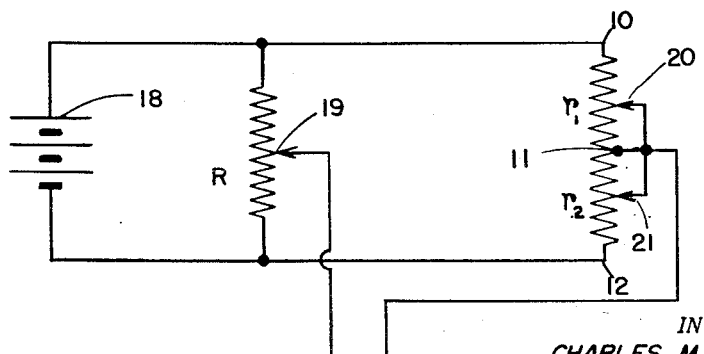
Fig. 6
INVENTOR.
CHARLES M. WOLFE
BY
D. Gordon Angus
ATTORNEY Patented Jan. 10, 1950

2,494,109

UNITED STATES PATENT OFFICE 2,494,109

METALLIC FILM ELECTRICAL PICKUP

Charles M. Wolfe, Glendora, Calif., assignor to Aerojet Engineering Corporation, Azusa, Calif., a corporation of Delaware Application April 29, 1949, Serial No. 90,289

8 Claims. (Cl. 201—48)

1

This invention relates to electrical pickup devices of the accelerometer or seismometer type or the like, and has for an object to provide such a device capable of delivering a relatively large output voltage over a wide range of frequency.

A related object is to provide such a device which is relatively small in size and simple in construction, and which requires relatively little auxiliary equipment in its use.

A further related object is to provide such a device which shall be relatively free from errors arising from temperature changes, changes of barometric pressure, and from vibration or shock or air currents occurring in opeation.

I carry out my invention by provision of a pair of posts mounted on a suitable mounting member. The surfaces of the posts which face each other are of an electrical conducting material, for example, a metallic coating, of substantial electrical resistance. There is held between the posts a reed-like member of electrical conducting material having its end free to move relative to the posts so as to vary the extent of the contact between the reed and the posts with relative movement of the reed. By reason of this arrangement, acceleration of the base produces bending of the reed, due to its inertia, resulting in the reed correspondingly increasing its surface contact with one or the other of the facing surfaces of the posts.

A feature of the arrangement is that the facing surfaces of the posts may be given desired configurations, so as to provide desired changes in resistance in response to acceleration. For example, a logarithmic response can thus be obtained.

Preferably, the elements are placed in an evacuated envelope, as this will minimize undesirable extraneous influences, such as dirt, humidity, air currents, temperature conditions, and the like, which might tend to produce irregularities of operation.

The device can be utilized in a well known manner, for example, in a bridge circuit or other measuring circuit, by taking electrical connections from the reed and from points on the conductive portions of the posts remote from the position of their contact with the reed.

A device of this character is especially suitable for test or control operations on aircraft or missiles, or the like; and may readily be used in association with engines such as jet engines.

The foregoing and other features of my invention will be better understood from the following detailed description and the accompanying drawings, of which:

Fig. 1 is an elevation view in cross section, showing a device according to my invention;

Fig. 2 is a cross section view taken at line 2—2 of Fig. 1;

Fig. 3 is a perspective view of a post included in the construction of Fig. 1;

Fig. 4 illustrates the pattern of a metallizing surface which may be placed on the posts used in Fig. 1;

Fig. 5 shows another form which the metallized pattern or coating on the posts may take; and Fig. 6 is a schematic wiring diagram showing a circuit in which the invention can be used.

Referring to the drawing, Fig. 1 shows an evacuated envelope 1 which may be for example of metal, mounted on a base member 2. This may be done, for example, in accordance with well known practice used in the construction and evacuation of vacuum tubes. There is mounted on the base 2 within the evacuated envelope a pair of posts 3 and 4, which should be of an insulating material, for example, porcelain. As shown in the perspective view, Fig. 3, of one of the posts, they each comprise a flat rectangular base portion, flat upright sides, and a curved face 5, this being the face which each presents toward the other when the two posts are fastened in position on the mounting base. Each post is provided with a covering or coating of conductive material such as a thin metallized coating 6 on its face 5, as shown in Fig. 1, so that this coating extends as a strip up the face 5, at the top strip 6 connects with a low resistance conductor surface 5a, which in turn connects to the base pin.

This conductive coating strip 6 should preferably be of a material having sufficient resistivity to work well in a bridge circuit, for example, in a preferred design the resistance of metal plating 6 is about 500 ohms. The conductive strip 6 is a metal plating adapted to adhere to the surface and to withstand such heat or cold as may be present, for example, gold, platinum, silver or other metals having high corrosion resistance. The conductivity per unit length of the coating may be regulated by regulating the thickness of the film which is deposited on the surface; and since it will be applied very thin it will have an appreciable resistance along the length of the strip.

Between the two opposed faces 5 of the blocks 3 and 4, there is placed a flexible reed 7, held firmly at its lower end between the two faces of the blocks having the conductive surfaces. The opposite faces 8 and 9 of the reed should be of an electrical conducting material, and ordinarily the reed itself will be a flexible metal strip. Preferably these faces 8 and 9 should be covered or coated with a very low resistance material, such as a silver or platinum or the like. The tendency of the reed to bend when the base is subjected to motion is enhanced by attaching a weight 13 to the free end or a free part of the reed; and the amount of inertia of the reed 7 can be adjusted by selection of the mass of the inertia element 13.

Terminal members 10, 11 and 12 are brought out through the base 2, so that they can readily be connected in a suitable socket or the like to a circuit. Terminal 10 is connected to the lower end of conductive strip 6 at the back of block 3; terminal 12 is connected to the lower end of conductive strip 6 at the back of block 4; and terminal 11 is connected to the lower end of the conducting surfaces of reed 7, which is also in contact with the lower ends of strip 6 at the faces 5.

To use the device, its base 2 will be mounted firmly on the object the acceleration of which is to be measured. As the reed can bend only in the direction of line 2—2 (Fig. 1) it will not be responsive to accelerations except those occurring in this direction. Acceleration in the direction of line 2—2 will, however, produce relative movement of the reed 7 relative to the blocks. This will be due to the inertia of the reed, the top of which will tend to remain in place while the base 2 moves according to the acceleration. Thus, with such acceleration, the reed 7 will change from its normal neutral position and will lie along a greater extent of the conductive strips of one or the other of the blocks 3 and 4, thus changing the length of the strip 6 which is in contact with the conductive surface of the reed. In the case of vibratory motion, the reed will move alternately along the conductive strips of blocks 3 and 4. The change of resistance of the metallized strips 6 remaining out of contact with reed 7 will be a measure of the acceleration.

It will be recognized that desired relationships between acceleration and change of resistance can readily be selected by selection of the shape of the strip 6, along the facing surfaces 5 of the blocks. Fig. 4, for example, shows the shape of a strip which may be placed along this surface 5. It comprises the portion 14 which will normally be in contact with the base of reed 7, and above portion 14 there is a portion 15 against which reed 7 will lie to a greater or lesser extent according to the acceleration; and above portion 15 there is the portion 16, preferably of lower resistance which connects with lower resistance surface 5a, which in turn connects to the base pin. This will give a predetermined change of resistance with acceleration.

Fig. 5 shows another form which the metallized surface may take along the front of the block. Here, the portion 17 instead of being of uniform width, as is the strip 15 in Fig. 4, is made of increasing width toward the top. This will result in a greater change of resistance for small amplitudes of swing of the reed than for larger amplitudes, and can give a logarithmic relationship between resistance and acceleration, which may often be a desirable feature where wide ranges of response are to be measured.

Fig. 6 shows a simple D. C. circuit in which the device of my invention can be used. The total resistance of each strip 6 of the blocks, when the reed is in neutral position, is considered to be $r_1$. The numerals 10, 11 and 12 represent the same terminals as in Fig. 1. As shown in Fig. 6, the two resistance elements $r_1$ are connected in series with each other, the base of the reed 7 being connected at terminal 11. A potentiometer R is connected across the series-arranged resistors $r_1$ and across a battery 18; and the output voltage is taken between the tap 19 of the potentiometer and the terminal 11. In the absence of acceleration, a balance can be obtained by adjusting the potentiometer tap for zero voltage output across points 12 and 19. When the acceleration is in one direction, along line 2—2, the reed 7 will lie along one of the resistance elements $r_1$ to short circuit a portion of it, depending on the acceleration, as represented by the terminal 20; and when the acceleration is in the opposite direction, the reed will move along the other resistance element $r_1$ to short circuit a part of it, depending on the amplitude of movement, as indicated by the other terminal 21. The changes in position of the reed, will produce a corresponding change of output voltage across terminals 12 and 19, which is a measure of the acceleration.

If it is desired to measure accelerations in directions other than along the line 2—2, an additional accelerometer device such as that shown in Fig. 1 can be employed with the faces of its reed directed in the new direction, which will ordinarily be at a right angle to the direction of the faces of the reed of the first accelerometer. For three-dimensional accelerations, three such pickups could be employed. Alternatively, the two or three accelerometer units could be constructed inside of a single evacuated envelope, ordinarily with the faces of the three reeds mutually at right angles to each other.

It will be recognized that many modifications can be made within the scope of the invention. For example, damping can be introduced into the reed by building it of laminated strips, or alternatively by placing a magnet in relation to it for induction damping.

Another modification could be that two or three or more accelerometers of varying sensitivity and varying range could be used or incorporated inside a single envelope.

I claim:

1. An accelerometer comprising a pair of posts of insulating material each having a face opposite to a face of the other, said opposite faces being placed close to each other at one position and curving away from each other from said position, each of said faces having a strip of electrical conducting material of appreciable resistance extending from said position and along the curved portions, a flexible reed having opposite sides of electrical conducting material and held between said faces at said position and extending freely from said position so that said reed is free to bend and lie along said curved portions of the faces.

2. An accelerometer according to claim 1 in which a terminal connection is made to the conducting sides of the reed and the conducting strips of the faces at said position, and a second terminal connection is made to a point of the conducting strip of one face which is remote from said position, and a third connection is made to the connecting strip of the other face which is remote from said position.

3. An accelerometer according to claim 2 in which the reed is tangent to the two faces at said position.

4. An accelerometer comprising an evacuated envelope having a base, there being mounted on the base within the envelope, a pair of post means of insulating material, each post means having a face opposite to a face of the other, said opposite faces being placed close to each other at a position near the base and receding away from each other above the base, each of said faces having a strip of electrical conducting material of appreciable resistance extending upward from said position and along the receding portions, a flexible reed held between said faces at said position and extending upwardly from the base so that the reed is free to bend toward either of said receding faces and to lie along portions of said receding faces, and three terminals extending through the base, one of said terminals being connected to the reed and the other two terminals being connected to the respective ones of said strips at places remote from said position.

5. An accelerometer according to claim 4 in which the conductive strips on said posts are carried up over the tops of the posts and down to the base.

6. An accelerometer according to claim 4 in which said conductive strips vary in width at the region where the reed can bend to be in contact with them.

7. An accelerometer according to claim 6 in which the strips increase in width in the direction upward from said position.

8. An accelerometer according to claim 4 in which the conductive strips of said posts are designed to give a functional response when the reed is progressively bent to come in contact with them.

CHARLES M. WOLFE.

No references cited.